(12) United States Patent
Koseoglu

(10) Patent No.: US 11,071,959 B2
(45) Date of Patent: *Jul. 27, 2021

(54) CATALYST LAYERING IN COMMERCIAL REACTOR BASKETS

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 42 days.

This patent is subject to a terminal disclaimer.

(21) Appl. No.: 16/687,200

(22) Filed: Nov. 18, 2019

(65) Prior Publication Data

US 2021/0146327 A1   May 20, 2021

(51) Int. Cl.
*B01J 8/02* (2006.01)
*B01J 8/04* (2006.01)

(52) U.S. Cl.
CPC .......... *B01J 8/0292* (2013.01); *B01J 8/0407* (2013.01); *B01J 8/0492* (2013.01); *B01J 2208/00884* (2013.01); *B01J 2208/025* (2013.01)

(58) Field of Classification Search
CPC ...... B01J 8/0292; B01J 8/0407; B01J 8/0492; B01J 2208/00884; B01J 2208/025
USPC ......................................................... 422/311
See application file for complete search history.

(56) References Cited

U.S. PATENT DOCUMENTS 4,288,409 A * 9/1981 Fedders ................. B01J 8/0035
422/219
4,615,796 A * 10/1986 Kramer .................. B01J 8/0085
208/146
6,291,603 B1   9/2001 Glover
6,656,342 B2   12/2003 Smith et al.
8,500,918 B1   8/2013 Meller et al.
(Continued)

FOREIGN PATENT DOCUMENTS

WO    2005123221 A2   12/2005
WO    2017080756 A1   5/2017

OTHER PUBLICATIONS

Singapore Written Opinion in Corresponding Singapore Application No. 11202000320W dated Feb. 5, 2021. 5 pages.
(Continued)

*Primary Examiner* — Huy Tram Nguyen
(74) *Attorney, Agent, or Firm* — Leason Ellis LLP

(57) ABSTRACT

A method of testing a catalyst in a reactor comprises supplying a feedstock into an upstream end of the reactor and arranging an annular basket within the reactor at a downstream position in the reactor, the annular basket having a central aperture for receiving the flow of feedstock and plurality of stacked layers separated by fluid permeable material, the plurality of stacked layers including a layer of grading material positioned upstream of a layer containing a primary catalyst to be tested for a chemical process. The grading material is adapted to filter out contaminants within the feedstock and to thereby protect the primary catalyst within the basket. Embodiments and methods can utilize layers comprising a first layer containing the primary catalyst, a second layer containing a hydrometallization catalyst and a third layer containing grading material having solid trap particles with reduced catalytic activity.

19 Claims, 3 Drawing Sheets

(56) References Cited

U.S. PATENT DOCUMENTS

| | | |
|---|---|---|
| 9,463,427 B1 | 10/2016 | Koseoglu et al. |
| 9,802,173 B2 | 10/2017 | Koseoglu et al. |
| 2001/0015336 A1 | 8/2001 | Glover |
| 2014/0001089 A1 | 1/2014 | Bazer-Bachi et al. |
| 2015/0034970 A1 | 12/2015 | Grossman et al. |

OTHER PUBLICATIONS

International Search Report and Written Opinion in Corresponding PCT Application No. PCT/US2020/060736 dated Feb. 8, 2021. 12 pages.

* cited by examiner

| Shape | Function | Grading by | Activity |
|---|---|---|---|
| | Solid trap | Void Size | Inert |
| | HDM | Activity | Low Activity |
| | HDM/HDS | Poresize | Medium Activity |
| | Hydrocracking | catalyst | High Activity |

CATALYST LAYERING IN COMMERCIAL REACTOR BASKETS

FIELD OF THE DISCLOSURE

The present disclosure relates to chemical processing, and more particularly relates to catalyst layering in reactor baskets.

BACKGROUND OF THE DISCLOSURE

Commonly-assigned U.S. Pat. No. 9,463,427 ('427 patent) entitled "Catalyst Reactor Basket" discloses a catalyst reactor basket (referred to as a "catalyst basket" herein) that is arranged to receive a combination of catalysts in separate chambers. The catalyst basket is also able to test multiple stacked layers of catalysts simultaneously. The '427 patent is incorporated by reference herein in its entirety for any purpose.

Catalyst baskets constructed in the manner described in the '427 patent have been put through numerous tests. The tests have unexpectedly demonstrated that the baskets capture a great deal of contaminants present in either or both of the feedstock and in processing plant infrastructure, such as particulates that accumulate through corrosion. For example, in one test, a catalyst basket was used in a reactor over a period of 18 months of operation. At the end of the period, the catalyst basket was opened for inspections and recovery of the individual catalysts. During the inspection it was observed that the basket was full of iron sulfide ash content. Since accumulation of iron sulfides is known to detrimental to the catalyst activity, it is believed that the performance of catalyst baskets in reactors degrades or, to use an industry term, is "poisoned" at an unexpectedly fast rate.

SUMMARY OF THE DISCLOSURE

In light of problem of iron sulfide contamination of catalyst baskets used in chemical reactors, the present disclosure provides a layered catalyst basket that incorporates layers of grading materials for absorbing the contaminants present in reactor feedstocks and infrastructure.

To solve the problem of catalyst contamination, the present disclosure provides a layered catalyst basket for testing a catalyst in a reactor that comprises an annular structure having an inner aperture allowing fluid feedstock flow through the structure, the annular structure having a plurality of layers arranged axially and separated from each other by fluid-permeable material, at least one of the plurality of layers containing a primary catalyst to be tested for a chemical process, and at least one layer positioned upstream with respect to the at least one layer containing the primary catalyst containing a grading material. The grading material is adapted to filter out contaminants within the feedstock and to thereby protect the primary catalyst.

In some embodiments, at least one of the plurality of layers includes radial dividers that create intralayer compartments.

Certain grading materials employed can have both filtration capability and hydrometallization catalytic activity and other can have filtration capability and negligible catalytic activity.

In some implementations, the plurality of layers comprises at least three layers, the three layers including a first layer containing the primary catalyst, a second layer containing a hydrometallization catalyst and a third layer containing grading material having solid trap particles with reduced catalytic activity. The plurality of layers can further include an additional layer including a material having hydrometallization and hydrosulfurization catalytic activity, the additional layer being arranged between the first and second layers.

The grading materials have sizes and shapes adapted to filter out feedstock contaminants including organic metallic compounds of vanadium, nickel, molybdenum and iron. In some embodiments, the grading materials have sizes and shapes adapted to absorb feedstock contaminants having diameters ranging from 10 μm to 1000 μm.

The grading material can be composed from alumina, silica, titania, or ceramic and can include void spaces comprising between 20 and 80 percent of a volume of the grading material.

In some embodiments, the grading material has macroporosity with an average pore size of more than 500 Å. The grading material can have an average thickness ranging from about 0.01 mm to about 5 mm. The shapes of the grading materials can vary and, in some implementations, can be trilobed, quadrilobed, cylinder, spheres, honey-comb and/or bird's nest shapes.

In some implementations of the layered catalyst basket, the fluid-permeable material that separates the plurality of layers comprises a wire mesh.

The present disclosure further provides a method of testing a catalyst or multiple catalysts in a reactor. The method comprises supplying a feedstock into an upstream end of the reactor, positioning an annular basket at a downstream position in the reactor, the annular basket having a central aperture for receiving the flow of feedstock, and arranging plurality of stacked layers of material within the basket separated by fluid permeable material, the plurality of layers including a layer containing grading material positioned upstream of a layer containing a primary catalyst to be tested for a chemical process. wherein the grading material is adapted to filter out contaminants within the feedstock and to thereby protect the primary catalyst within the basket.

In some embodiments, the step of arranging a plurality of stack layers includes providing a first grading material adapted to filter metallic contaminants from the feedstock, a second grading material positioned downstream from the first grading material having both filtration and hydrometallization catalytic activity, and the primary catalyst downstream from the second grading material.

The first grading material is adapted to filter out organic metallic compounds of vanadium, nickel, molybdenum and iron.

In some embodiments at least one of the plurality of layers includes a material having both hydrometallization and hydrosulfurization catalytic activity.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

The present disclosure describes a layered catalyst basket that protects the main bed catalysts from fouling and poisoning during hydroprocessing. The basket includes layers of grading and guard bed materials that prevent problems with pressure drop and fouling and thereby significantly increase cycle length. The grading and guard bed materials are designed to remove or reduce scale matters, e.g., iron sulfide, arsenic, mercury, iron, silicon, vanadium, nickel, or sodium. Grading and guard bed materials are generally porous material that can have a varied range of catalytic activity. Hereinafter, both grading and guard bed materials are collectively referred to as "grading materials" for convenience.

Figure 1:
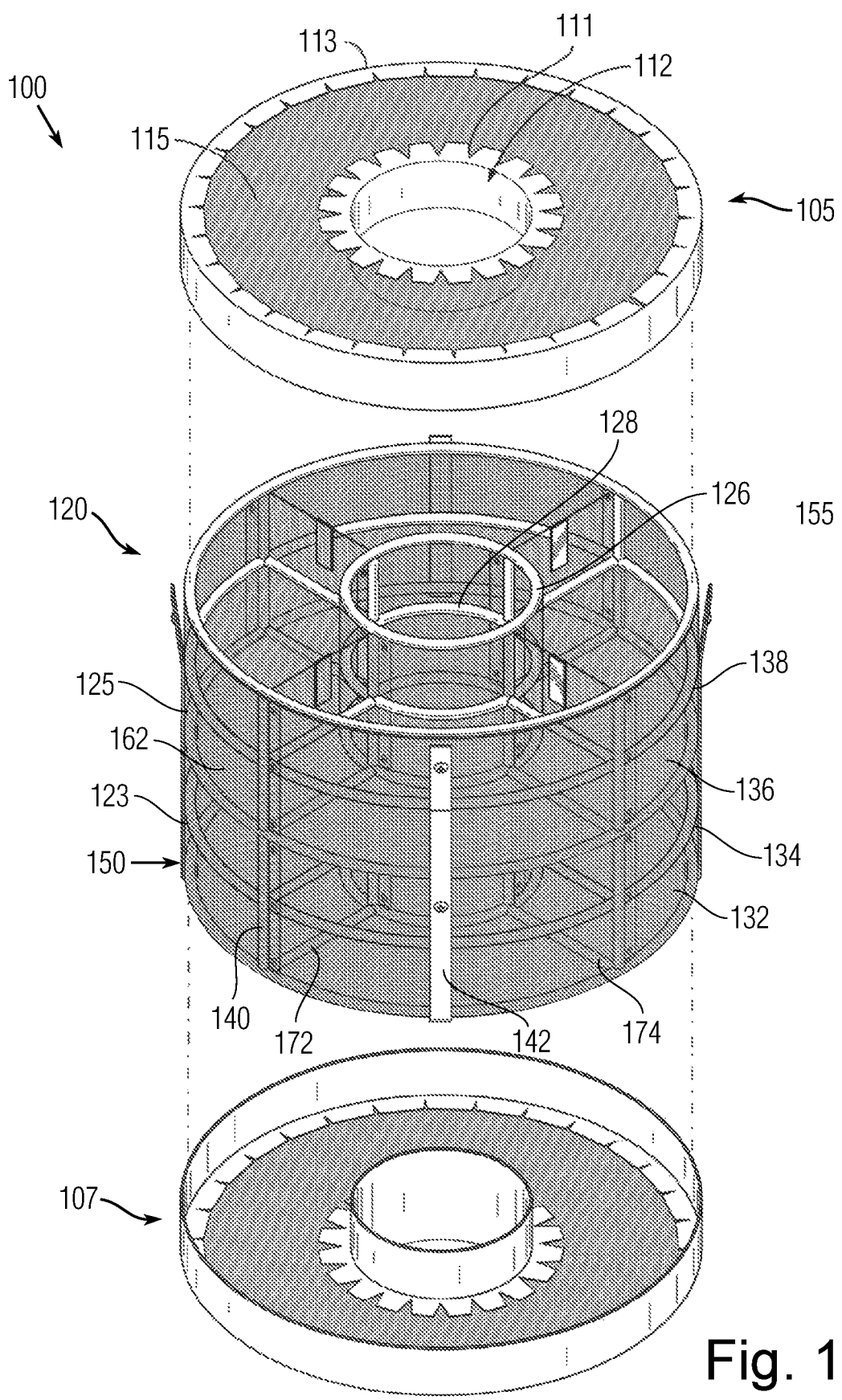
FIG. 1 is an exploded view of an embodiment of a layered catalyst basket according to the present disclosure

FIG. 1 shows an embodiment of a layered catalyst basket 100 ("layered basket") according to the present disclosure. The layered basket 100 is intended to be placed in a reactor to test the performance of catalysts contained within the basket. As shown in FIG. 1, the layered basket 100 is generally annular in shape and has a generally circular aperture 102 that extends axially through the basket through which fluid feedstocks can be received from upstream in the reactor. Annular covers 105, 107 are removably positioned to cover the axial ends of the basket. Cover 105 includes an inner rim 111 and an outer rim 113. The rims 111, 113 extend around the inner and outer circumferential peripheries and provide structural rigidity to the cover. A first mesh screen 115 is securely fixed to and extends between the rims 113 and 115. The mesh 115 is sized and shaped to provide holes that allow fluid to pass through the mesh during use of the layered basket while also preventing grading and catalyst particles or containers from passing through the mesh. As such, the grading and catalyst particles are retained within the basket. Cover 107 includes features to cover 105 and are not explicitly shown in FIG. 1.

Figure 2:
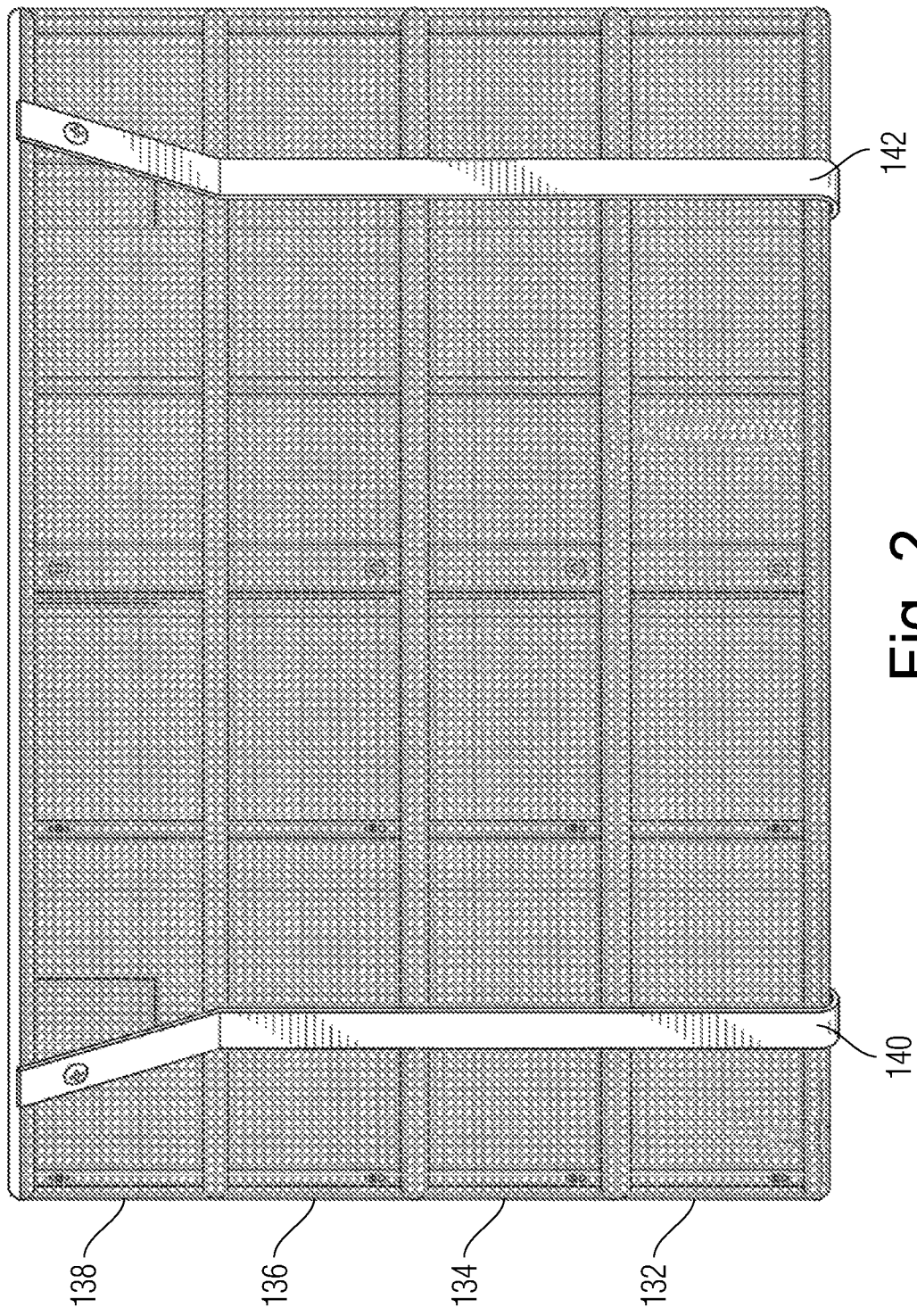
FIG. 2 is a side view of the embodiment of the layered catalyst basket shown in FIG. 1.

The layered basket 100 includes a support frame 120, the components of which can be formed from tubular or solid metal bars. The support frame 120 includes outer rings. e.g., 123, 125, which are positioned at and form the outer circumference of the basket. Inner rings, e.g., 126, 128 are positioned surrounding the circular aperture 102. The spaces between adjacent outer rings e.g., 123, 125 constitute horizontal layers 132, 134, 136, 138 in which grading and catalyst materials can be contained, as will be explained further. FIG. 2 is a side view of the layered basket 100 that more clearly illustrates the arrangement of layers 132-138 in the layered basket 100. For instance, the space between specific outer rings 123 and 125 constitutes horizontal layer 134. Each of the horizontal layers 132-138 can further include separate compartments divided by radial dividers. The outer rings are linked by vertical crossbar supports e.g., 140, 142. The crossbar supports can extend across and link all the outer rings as shown, or individual crossbar supports can link adjacent outer rings. The outer rings are also linked to the inner ring supports via radial partitions with supports, e.g., 172, 174. The support frame components can be connected using suitable fasteners and/or fastening methods, such as welding, for example.

The outer and inner walls 150, 155 are preferably permeable so that liquid material can flow through in either direction through the walls while providing a barrier to solid materials of a diameter greater than the wall mesh size. The walls 150, 155 can be made from a woven steel mesh, for example. In some embodiments, the outer and inner walls 150, 155 can alternatively be made from non-permeable steel plate to prevent liquid materials from entering or exiting the basket. For example, in certain down flow reactors, the liquid flow is axial therefore no flow is expected to flow through the outer and inner walls and, therefore, surfaces, or at least portions thereof, that are parallel to the axial flow direction can be non-permeable. In certain implementations, the mesh can be steel wire cloth, woven, 14×14 mesh with a 0.020 inch wire diameter. However, depending on the application, other mesh sizes can be used. The wire mesh of the inner and outer walls can be secured to the support frame components using wire. Other suitable attachment means and methods are also contemplated.

In addition to the outer and inner walls, the top and bottom of each layer 132-138 is defined by a mesh divider that extends between each corresponding set of outer and inner rings that are arranged at the same height on the support frame. For example, dividing mesh 162 extends between outer ring 125 and inner ring 126. The dividing meshes are fluid permeable so that fluid can flow through the dividing walls in an axial direction along the height of the basket. In certain implementations, the dividing meshes can be made of the same woven mesh as the inner and outer walls. In addition, radial partitions e.g., 172, 174 can extend radially between the inner and outer rings of the support frames. The radial partitions can be used to divide each layer into a number of separate compartments. For example, radial partitions can divide each layer into 2, 3, 4 or a large number of compartments. Each compartment can receive and hold materials such as grading or catalyst materials. The radial partitions, e.g., 172, 174 are preferably fluid impermeable so that effect of material in one compartment can be more readily isolated from the material in an adjacent compartment. For example, the partitions can be made from solid steel sheet material.

In some embodiments, the radial partitions in the individual layers 132-138 are aligned so that compartments in any layer are aligned with corresponding compartments in the other layers. Alternatively, the radial partitions can be arranged such that a compartment in a particular layer is shaped and positioned such that there is overlap between compartments of one or more adjacent layers.

The layered basket 100 enables several different catalysts to be tested simultaneously and also enables the tested catalysts to be guarded from fouling and contaminant materials. The covers 105, 107 can be removed from the top and bottom ends of the layer basket to allow for filling the bottom and top layers 132, 138 (and compartments thereof) with material. In addition, prior to installation of the basket in a reactor, the outer wall 150 can be disengaged so that the layers 132-138 are exposed and materials can be loaded into any of the layers and compartments thereof. Hooks can optionally be provided to couple the basket to fixture at a selected position in a reactor. The hooks can also be used to support the basket during loading and unloading of the catalyst at the end of the reactor cycle. The catalysts are usually vacuumed at the end of the cycle.

The layered basket 100 provides catalyst grading solutions that are tailored to the input feedstock to trap solid particles and other contaminants, filter out catalyst poisons and metal corrosion debris, and convert coke precursors. This ensures the most efficient hydrogenation and hydrocracking activity, minimizes pressure drop build-up, and achieves significant savings on catalyst replacement. Turning again to FIG. 2, the layers 132-138 can be filled with a combination of grading materials and catalysts in stacked layers. Some layers 132-138 can be filled with a grading material of a single type or a plurality of different grading materials can be placed in a single layer. The grading materials can have a catalyst function themselves or they can act solely as filters. More generally, catalytic materials and grading materials can be mixed in individual layers or, depending on the application, the grading materials and primary catalytic materials can be placed in separate layers. Within each a layer containing grading materials, the characteristics of the material can be graded, that is gradually increased or decreased over the height of the layer, or within the separate compartments of a layer. The grading provides additional control over the rate at which processes occur in the reactor.

Typical feedstock contaminants include inorganic, organic or organo-metallic compounds of vanadium, nickel, molybdenum and ion that corrode or leach out of metallic infrastructure elements. Feedstock contaminants can include other materials such as polymers, carbon particulars, dust and other impurities having average sizes between 10 and 1000 micrometers (μm).

The grading materials can have a variety of sizes, shapes and chemical composition. For example, the grading material can be made of alumina, silica, silica, titania, ceramic, or combinations thereof and can be formed in trilobed, quadilobed, cylinder, sphere, honey-comb, and bird's nest shapes. It can be useful for some grading materials to have porosity or void spaces. In some instances, the grading materials have macroporosity with a diameter of at least 500 Å in 20 percent to 80 percent of the total pores. The pores can take a variety of shapes including triangular, round and irregular. The different materials, shapes, sizes and pore volumes affect the activity of the materials and are tailored for specific contaminants.

In some implementations, the loading density of the grading material can range from about 0.05 to about 0.7 kg/m3. Average thickness in some implementations can range from about 0.01 mm to about 5 mm. The height to diameter ratio of the grading particles can range from 0.3 to 2 in some instances. Grading materials can have average strength of greater than 0.4 KN/grain in the vertical direction and 40 KN/grain in the horizontal direction.

Figures 3A, 3B:
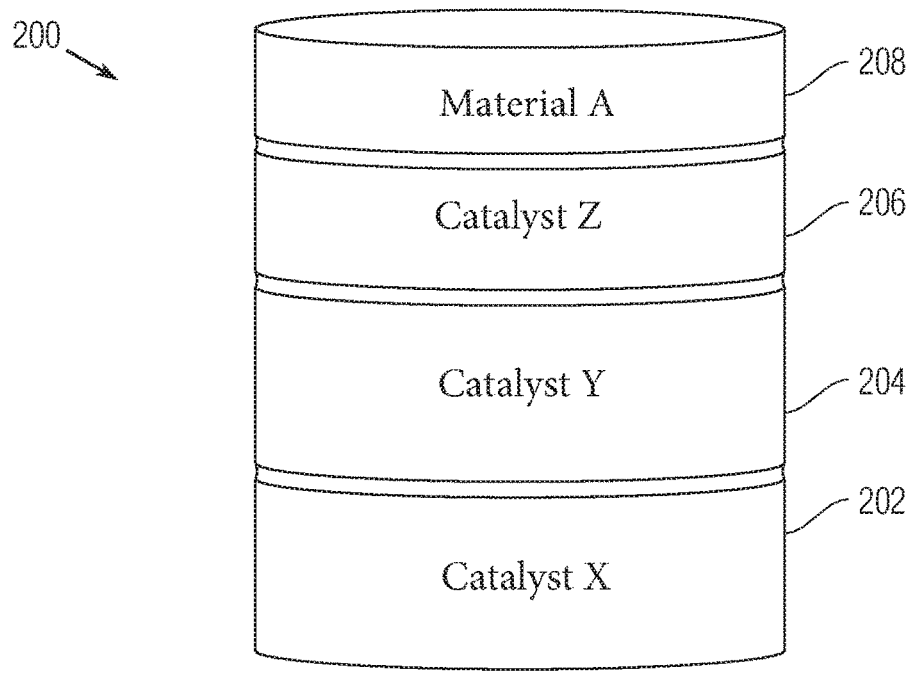
FIG. 3A is schematic view of an embodiment of a layered catalyst basket including an implementation with specific grading materials and catalysts for hydrocracking processes.
FIG. 3B is a table illustrating characteristics of the specific grading materials and catalysts used in the embodiment shown in FIG. 3A.

FIG. 3A is a schematic rendering of an exemplary layered basket 200 with a specific series of materials that can be used for certain types of hydroprocessing. FIG. 3B is a table illustrating characteristics of the specific grading materials and catalysts used in the embodiment shown in FIG. 3A. In operation, it is advantageous to place the grading materials upstream from the catalyst materials to enable the grading materials to absorb contaminants from the feedstock, preventing the contaminants from reaching the catalysts. In the embodiment depicted, the lowest layer 202 contains a high activity hydrocracking catalyst Catalyst X and is the primary catalyst which the materials used in the additional, higher layers are designed to protect. Layer 204, positioned above layer 202 containing the primary catalyst, contains Catalyst Y, which is a hydrodemetallization (HDM) and hyrdosulfurization (HDS) catalyst and can be used to reduce metals, asphaltenes and carbon residue. The Catalyst Y material has medium catalytic activity and is graded according to pore size. Layer 206, positioned above layer 204, contains Catalyst Z, which is a cylindrically-shaped material with high hydrometallization activity but lower hydrosulfurization activity. The Catalyst Z material is graded within layer 206 according to the activity of the material. Top layer 208 contains solid trap particles Material A that have no catalytic activity and are graded by void size. The solid trap particles can be honey-combed shaped as shown, but traps with other shapes and void configurations can be used.

In the layered basket of FIG. 3A, the solid trap Material A and Catalyst Z materials capture all the solid material present in the feedstock or system. The hydrometallization activity of the Catalyst Z and Catalyst Y materials positioned downstream of the solid trap particles serve to demetallize the feedstock by converting organometallic porphyrin compounds into metals which are then captured. In combination, the grading materials protect the main bed catalyst positioned at the bottom layer of the basket (Catalyst X) from fouling and poisoning. This prevents the reduction in catalyst activity that limits the reactor unit cycle length. The disclosed system of grading materials and catalysts also prevent problems with pressure drop and fouling.

The critical need for the additional grading materials in the catalyst basket for catalyst testing is due to the unexpected amount of iron sulfide that appeared in tested commercial reactors. It is difficult to predetermine the magnitude of iron sulfide contamination that a reactor will be exposed to because the sources of the contamination throughout the infrastructure are manifold and can therefore be both expensive and costly to inspect before catalyst testing procedures commence. Accordingly, the addition of layers of grading material according to the disclosure meets an unmet need in response to unexpected results obtained during commercial testing.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A layered catalyst basket for testing a catalyst in a reactor, comprising:
    an annular structure having an inner aperture allowing fluid feedstock flow through the structure, the annular structure having a plurality of layers arranged axially and separated from each other by fluid-permeable material, at least one of the plurality of layers containing a primary catalyst to be tested for a chemical process, and at least one layer positioned upstream with respect to the at least one layer containing the primary catalyst containing a grading material, and
    wherein the grading material is adapted to filter out contaminants within the feedstock and to thereby protect the primary catalyst; and
    wherein at least one of the plurality of layers includes radial dividers that create intralayer compartments.

2. The layered catalyst basket of claim 1, wherein the grading material has filtration capability and hydrometallization catalytic activity.

3. The layered basket of claim 1, wherein the grading material has filtration capability and negligible catalytic activity.

4. The layered catalyst basket of claim 1, wherein the plurality of layers comprises at least three layers, the three layers including a first layer containing the primary catalyst, a second layer containing a hydrometallization catalyst and a third layer containing grading material having solid trap particles with reduced catalytic activity.

5. The layered catalyst basket of claim 4, wherein the plurality of layers comprises an additional layer including a material having hydrometallization and hydrosulfurization catalytic activity, the additional layer being arranged between the first and second layers.

6. The layered catalyst reactor basket of claim 1, wherein the grading materials have sizes and shapes adapted to filter out feedstock contaminants including organic metallic compounds of vanadium, nickel, molybdenum and iron.

7. The layered catalyst reactor basket of claim 1, wherein the grading materials have sizes and shapes adapted to absorb feedstock contaminants having diameters ranging from 10 μm to 1000 μm.

8. The layered catalyst basket of claim 1, wherein the grading material is composed from at least one of alumina, silica, titania, and ceramic.

9. The layered catalyst basket of claim 1, wherein the grading material includes void spaces comprising between 20 and 80 percent of a volume of the grading material.

10. The layered catalyst basket of claim 1, wherein the grading material has macroporosity with an average pore size of more than 500 Å.

11. The layered catalyst basket of claim 1, wherein the grading material has an average thickness ranging from about 0.01 mm to about 5 mm.

12. The layered catalyst basket of claim 1, wherein the fluid-permeable material that separates the plurality of layers comprises a wire mesh.

13. The layered catalyst basket of claim 1, wherein grading material has at least one of a trilobed, quadrilobed, honey-comb and bird's nest shape.

14. A method of testing a catalyst in a reactor comprising:
    supplying a feedstock into an upstream end of the reactor;
    positioning an annular basket at a downstream position in the reactor, the annular basket having a central aperture for receiving the flow of feedstock; and
    arranging plurality of stacked layers of material within the basket separated by fluid permeable material, the plurality of layers including a layer containing grading material positioned upstream of a layer containing a primary catalyst to be tested for a chemical process; and
    arranging radial dividers in at least one of the plurality of layers to create intralayer compartments;
    wherein the grading material is adapted to filter out contaminants within the feedstock and to thereby protect the primary catalyst within the basket.

15. The method of claim 14, wherein the step of arranging a plurality of stack layers includes providing a first grading material adapted to filter metallic contaminants from the feedstock, a second grading material positioned downstream from the first grading material having both filtration and hydrometallization catalytic activity, and the primary catalyst downstream from the second grading material.

16. The method of claim 15, wherein the first grading material is adapted to filter out organic metallic compounds of vanadium, nickel, molybdenum and iron.

17. The method of claim 14, wherein the grading material is composed from at least one of alumina, silica, titania, and ceramic.

18. The method of claim 14, wherein the grading material includes void spaces comprising between 20 and 80 percent of a volume of the grading material.

19. The method of claim 14, wherein at least one of the plurality of layers includes a material having both hydrometallization and hydrosulfurization catalytic activity.

* * * * *